United States Patent [19]
Cirineo

[11] Patent Number: 5,982,167
[45] Date of Patent: Nov. 9, 1999

[54] TONE GENERATOR AND TRANSMITTER CARD FOR USE IN A FLIGHT LINE TEST SET

[75] Inventor: Anthony Cirineo, Ventura, Calif.

[73] Assignee: The United States of America as represented by the Secretary of the Navy, Washington, D.C.

[21] Appl. No.: 08/995,793

[22] Filed: Dec. 22, 1997

[51] Int. Cl.[6] ........................... H04B 1/00
[52] U.S. Cl. .................. 324/158.1; 324/73.1; 455/42
[58] Field of Search ..................... 324/158.1, 73.1; 455/42, 39, 88, 126

[56] References Cited

U.S. PATENT DOCUMENTS

| 4,955,083 | 9/1990 | Phillips et al. | 455/47 |
| 5,359,340 | 10/1994 | Yokota | 343/792 |
| 5,703,307 | 12/1997 | Ikeya | 84/603 |
| 5,736,937 | 4/1998 | MaGirr et al. | 324/402 |

Primary Examiner—Josie Ballato
Assistant Examiner—T. R. Sundaram
Attorney, Agent, or Firm—David Kalmbaugh

[57] ABSTRACT

A personal computer card which includes four tone generators connected to a radio frequency synthesizer which, in turn, is connected to a 400 MHz helical rubber coated antenna. Each of the four tone generators may be programmed to generate any one of twenty Interrange Instrumentation Group standard decoder tones which are used for testing the flight termination receivers and decoder in certain weapons systems such as a missile. The standard decoder tones generated by each of the four tone generators are supplied to the radio frequency synthesizer. The radio frequency synthesizer frequency modulates the IRIG tones onto a carrier signal in the flight termination band which is in a range from 400 MHz to 440 MHz. The modulated radio frequency signal is then supplied to the antenna for transmission to the weapons system being tested.

11 Claims, 4 Drawing Sheets

TONE GENERATOR AND TRANSMITTER CARD FOR USE IN A FLIGHT LINE TEST SET

BACKGROUND OF THE INVENTION

1. Field of the Invention

This invention relates generally to apparatus for testing a weapon such as a missile. More particularly, the present invention relates to a tone generator circuit and a flight termination transmitter which are included in a flight line test set adapted for testing flight termination systems in a missile.

2. Description of the Prior Art

The Interrange Instrumentation Group (IRIG) of the Department of Defense, now known as the Range Commanders Counsel, has defined a set of standard decoder tones to be used with flight termination receivers and decoders on board missiles such as the Standoff Land Attack Missile. The flight termination system on board the missile is activated upon receiving these decoder tones from an external source and having the tones decoded by the missile's on board decoders.

The termination of missile's flight such as during a test flight, may occur when the missile veers off course and threatens to impact a populated area causing severe damage and a possible loss of life.

At present there is not commercially available tone generator and transmitter which will generate and then transmit the IRIG tones for use by a missile's on board flight termination system which when decoded will terminate the flight of the missile.

Accordingly, there is a need for a tone generator to generate the IRIG standard decoder tones for use by a missile's on board flight termination system to terminate the flight of missile should the missile veer off course. There is also a need for a transmitter to be coupled to the tone generator for transmitting the IRIG standard decoder tones to the missile's on board flight termination receiver for processing by the flight termination system including its tone decoder.

SUMMARY OF THE INVENTION

The present invention comprises a personal computer card which includes four tone generators connected to a radio frequency synthesizer which, in turn, is connected to a 400 MHz helical rubber coated antenna. Each of the four tone generators may be programmed to generate any one of twenty Interrange Instrumentation Group (IRIG) standard decoder tones which are used for testing the flight termination receivers and decoder in certain weapons systems such as a missile.

The IRIG tones generated by each of the four tone generators are supplied to the radio frequency synthesizer. The radio frequency synthesizer frequency modulates the IRIG tones onto a carrier signal in the flight termination band which is in a range from 400 MHz to 440 MHz. The modulated radio frequency signal is then supplied to the antenna for transmission to the weapons system being tested.

DETAILED DESCRIPTION OF THE PREFERRED EMBODIMENT

Figure 1:
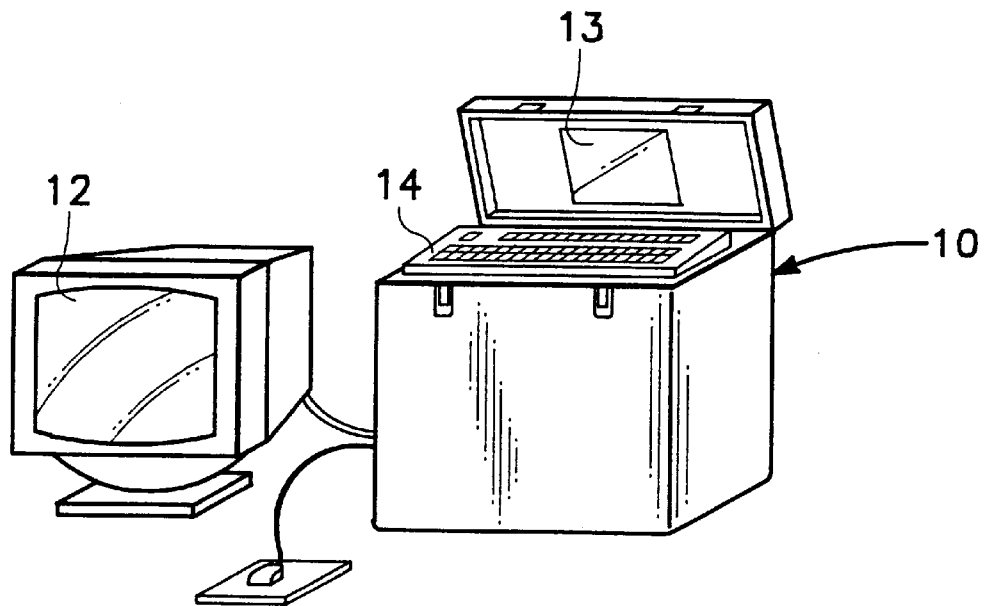
FIG. 1 is a perspective view of the flight line test set which includes the tone generator and flight termination transmitter of the present invention.

Referring to FIG. 1, there is shown a portable flight line test set 10 which is used to test a weapon's flight termination system prior to the weapon being loaded on an aircraft. Flight line test set 10 is designed for use with the Standoff Land Attack Missile and the Joint Stand Off Weapon and may be adapted for use with a variety of missile systems. Test set 10 comprises a telemetry receiver, a bit sync, a decommutator, an encryption support card and a flight termination transmitter PC card 20 which includes the electrical components illustrated in FIG. 2. Test set 10 also has a monitor 12, a Liquid Crystal Display 13 and a keyboard 14 which allows a user of test set 10 to access and program test set 10 in accordance with the requirements of the weapon being tested. It should be noted that test set 10 and the cards included therein are IBM PC (personal computer) compatible.

Figure 2:
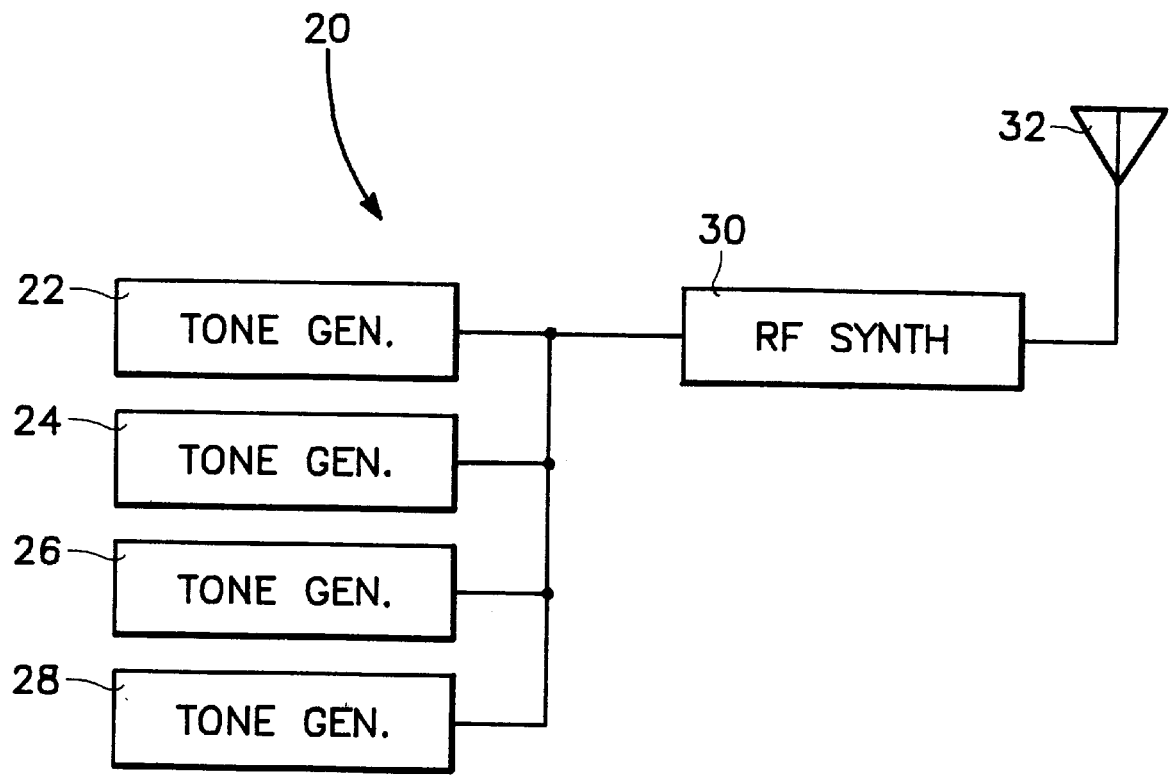
FIG. 2 is a block diagram of the tone generator and flight termination transmitter constituting the present invention.

Referring to FIGS. 1 and 2, the flight termination transmitter PC card 20 includes four tone generators 22, 24, 26 and 28 each of which has an output connected to the input of a Radio Frequency (RF) synthesizer 30. The output of synthesizer 30 is connected to a 400 MHz helical rubber coated antenna 32 which mounts to a BNC connector on the PC card 20. The PC card 20 interfaces to an eight bit PC bus interface within test set 10.

The eight bus interface used in test set 10 is a ELPD 7128 programmable array logic device commercially available from Altera Corporation of San Jose, Calif. However, it should be noted that PC card 20 is designed to interface generally with most commercially available eight bit PC buses.

The PC card 20 may be programmed to generate frequencies from one hertz to three hundred kilo-hertz with a frequency resolution below one hertz. The IRIG standard decoder tones span a frequency range from about 7500 Hz to about 76 kHz. The four tone generators 22, 24, 26 and 28 of card 20 may be used to generate four IRIG standard decoder tones or frequencies simultaneously. The selection of the tones generated by each of the tone generators 22, 24, 26 and 28, their amplitude which determines their deviation, the frequency of RF synthesizer 30 and the RF output operate through software control.

Appendix A is a program listing for the PC card development software drivers which is written in the well known "C" program language. PC card 20 is controlled through 16 registers which are I/O addressed. The test set 10 functions include (1) SetToneFreq which sets the frequency in hertz of the selected tone generator 22, 24, 26 or 28; (2) SetToneAmp which sets the amplitude of the selected tone generator 22, 24, 26 or 28; (3) EnableTone which either turns on or off the output of the selected tone generator 22, 24, 26 or 28; (4) SetXmtrFreq turns off the RF output and set up its center frequency in MHz; and (5) EnableRF turns on or off the RF output.

Figure 3:
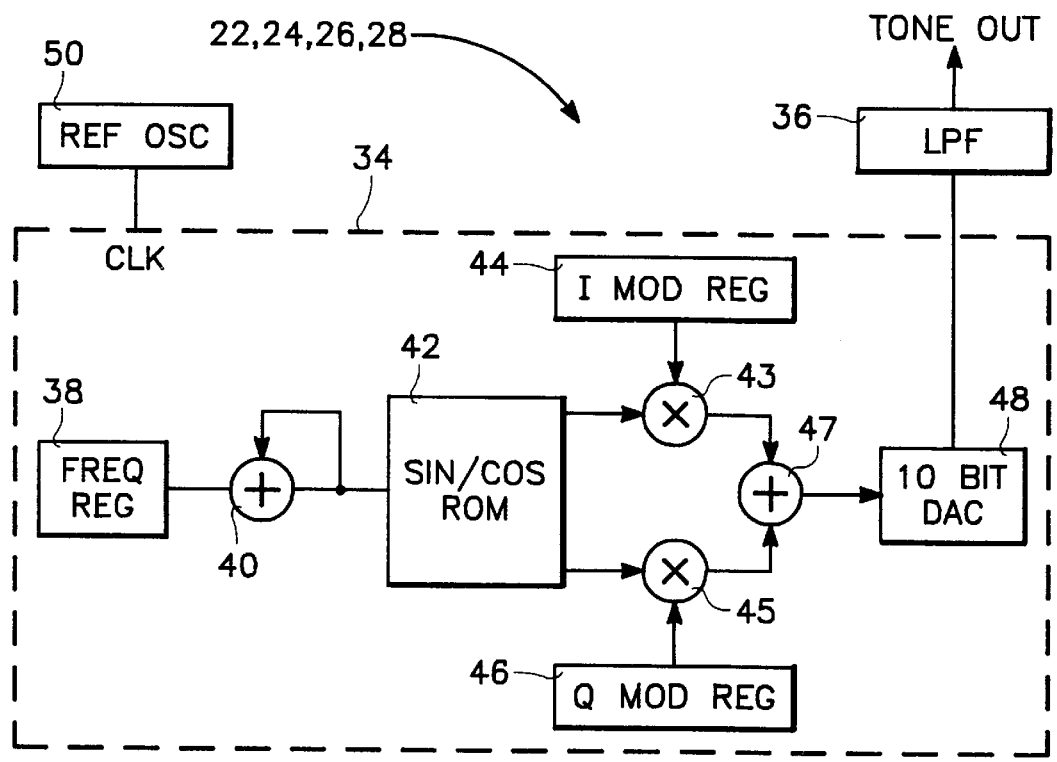
FIG. 3 is detailed electrical schematic diagram of the tone generator of the present invention.

Each of the IRIG standard decoder tones, which are set forth in the following table, are generated by a direct digital synthesis circuit 34 which is connected to the input of a low pass filter 36 (FIG. 3).

TABLE I

| Tone | error | Frequency, Hz | Phase Word |
|------|---------|---------------|-------------|
| 1 | −0.007% | 7500.0001 | 12,884,902 |
| 2 | 0.019% | 8459.9998 | 14,534,169 |
| 3 | 0.012% | 9539.9999 | 16,389,595 |
| 4 | 0.014% | 10759.9999 | 18,485,539 |
| 5 | 0.011% | 12139.9999 | 20,856,361 |
| 6 | −0.013% | 13700.0001 | 23,536,421 |
| 7 | −0.006% | 15450.0001 | 26,542,898 |
| 8 | −0.001% | 17430.0001 | 29,944,512 |
| 9 | −0.011% | 19660.0001 | 33,775,623 |
| 10 | −0.001% | 22170.0000 | 38,087,770 |
| 11 | −0.010% | 25010.0001 | 42,966,853 |
| 12 | −0.002% | 28210.0000 | 48,464,411 |
| 13 | −0.023% | 31830.0002 | 54,683,524 |
| 14 | 0.022% | 35889.9998 | 61,675,730 |
| 15 | 0.019% | 40489.9998 | 69,561,290 |
| 16 | 0.025% | 45679.9997 | 78,477,642 |
| 17 | −0.006% | 51530.0001 | 88,527,866 |
| 18 | −0.006% | 58120.0002 | 99,849,400 |
| 19 | 0.022% | 65559.9998 | 112,631,222 |
| 20 | −0.022% | 73950.0002 | 127,045,133 |

The output of low pass filter 36 is connected to RF synthesizer 30.

Each of the tone generators 22, 24, 26 and 28 comprises the circuitry illustrated in FIG. 3. The direct digital synthesis circuit 34 used in the preferred embodiment of the present invention is an AD7008 CMOS DDS Modulator commercially available from Analog Devices of Norwood, Mass.

Direct digital synthesis circuit 34 comprises frequency register 38 which has the phase word (Table I) for the selected frequency loaded therein. Thus, if the tone generator 22, 24, 26 or 28 is to provide a frequency of 28210.0000 hertz the phase word to be loaded into register 38 is a thirty two bit digital word for the phase word 48,464,411. Similarly, if the tone generator 22, 24, 26 or 28 is to provide a frequency of 58120.0002 the phase word to be loaded into register 38 is a thirty two bit digital word for the phase word 99,849,400. The clock frequency for direct digital synthesis circuit 34 is 2.5 megahertz and is derived from a 10 MHz reference oscillator 50 (FIG. 4) within RF synthesizer 30.

At this time it should be noted that the reference oscillator 50 used in the present invention is a ten megahertz crystal oscillator which has a temperature stability of 1.5 ppm from −20 to 70 degrees Celsius and is commercially available from Micro Crystal Division of ETASA, Grenchen, Switzerland.

The output of frequency register 38 is connected to a phase accumulator 40. Phase accumulator 40 generates a continuous thirty two bit phase signal which avoids any output discontinuity when switching between frequencies.

Direct digital synthesis circuit 34 has Sine and Cosine Look-Up Tables included in a Sine/Cosine ROM 42 which is connected to phase accumulator 40. To make the output of circuit 34 useful, the signal from phase accumulator 40 must be converted from phase information into a sinusoidal value. Since phase information maps directly into amplitude, a ROM look up table converts the phase information into amplitude. To do this the digital phase information is used to address a Sine/Cosine ROM 42. Only the most significant 12 bits of each 32 bit digital phase word are used for this purpose. The remaining 20 bits provide frequency resolution and minimize the effects of quantization of the phase to amplitude conversion.

Sine/Cosine ROM 42 is connected to a multiplier 43 and a multiplier 45. A 10 bit I modulation register 44 is also connected to multiplier 43, while a 10 bit Q modulation register 46 is also connected to multiplier 45. Registers 44 and 46 are used to control the amplitude of the I (cosine) and Q (sine) signals which allows for the setting and controlling of the modulated RF output.

Multipliers 43 and 45 are connected to a summer 47 which is, in turn, connected to a ten bit digital to analog converter 48. Converter 48 converts the summed digital I and Q signals from summer 47 to an equivalent analog signal. Converter 48 is connected to a low pass filter 36. Low pass filter 36 is an active 2 pole filter with a cut off frequency of 250 kHz which is about ten times lower than the sample rate for Digital to Analog Converter 48.

Figure 4:
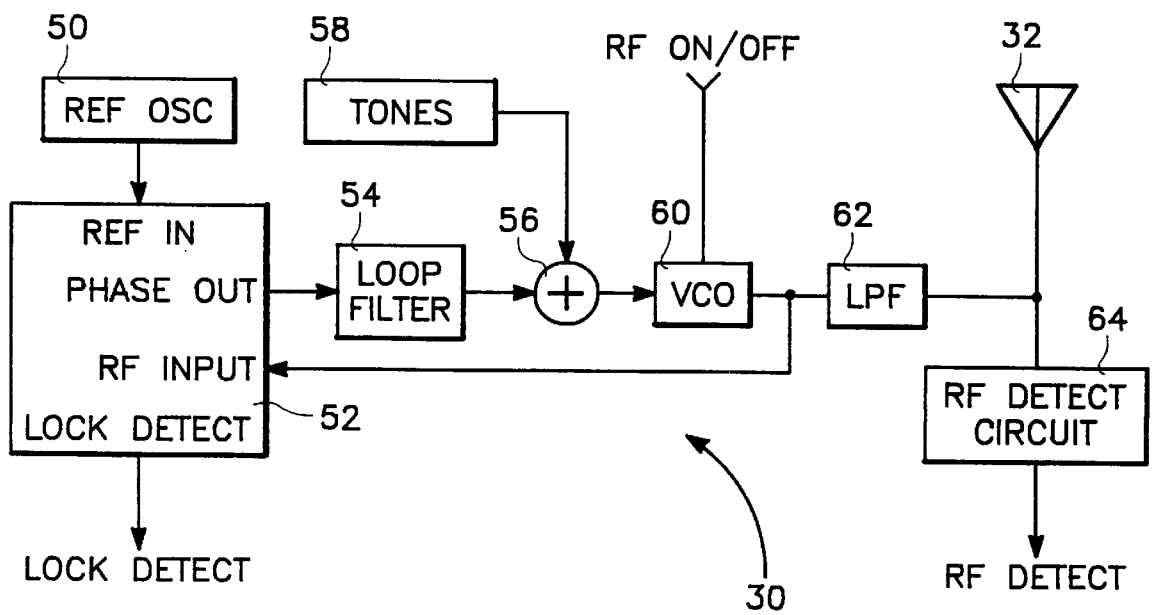
FIG. 4 is a detailed electrical schematic diagram of the flight termination transmitter of the present invention.

Referring to FIGS. 3 and 4, RF synthesizer 30 includes a 2.0 GHz Phase Lock Loop circuit 52 which has connected to its Ref In input reference oscillator 50. The Phase Out output of Phase Lock Loop circuit 52 is connected to the input of a Loop filter 54. The output of Loop filter 54 is connected to a summer 56 which also has connected thereto the tone output 58 of each the tone generators 22, 24, 26 and 28 (FIG. 2). Summer 56 is connected to the input of a voltage controlled oscillator 60 with the output of voltage controlled oscillator 60 being connected RF Input of Phase Lock Loop circuit 52.

Loop filter 54 sets the natural frequency and the damping ratio of the phase lock loop which includes Phase Lock Loop circuit 52, Loop filter 54, summer 56 and voltage controlled oscillator 60. Loop filter 54 is a second order active filter with a cutoff frequency of about 2 KHz. The modulating input from tone generators 22, 24, 26 and 28 (FIG. 2) are summed into the phase lock loop at summer 56.

Figure 5:
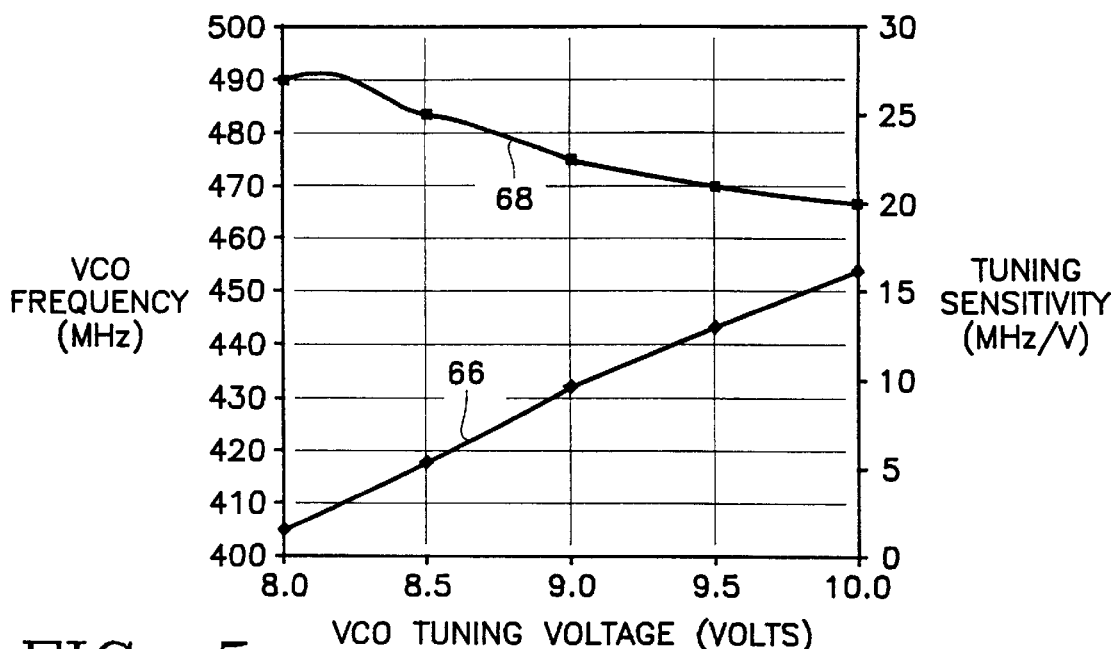
FIG. 5 is a plot illustrating tuning sensitivity of the voltage controlled oscillator of the transmitter of FIG. 4.

The input/tuning voltage to the voltage controlled oscillator 60 controls the frequency of the output signal provided by oscillator 60. RF synthesizer 30 will tune over a range from 350 MHz to about 460 MHz, but the frequencies generally used are 406 MHz, 415 MHz, 425 MHz and 429 MHz. Line/curve 66 of FIG. 5 depicts the tuning curve for voltage controlled oscillator 60. The tuning voltage to oscillator 60 is around 8.7 volts which results in a frequency of about 425 MHz which is the carrier frequency of the Frequency Modulated signal generally provided by RF synthesizer 30.

Line/curve 68 of FIG. 5 depicts the tuning sensitivity of voltage controlled oscillator 60 in MHz/V. Over the normal operating range of oscillator 60 within synthesizer 30, which is from about 8.0 volts to 9.0 volts, the tuning sensitivity varies from about 27 V/MHz to about 19 V/MHz. This necessitates that the required deviation at various frequencies be a function of center frequency. The programmable outputs of tone generators 22, 24, 26 and 28 allow the correct modulation drive level to be set as a function of center frequency under the control of the computer software of Appendix A.

The RF input of Phase Lock loop circuit 52 receives the frequency modulated signal from oscillator 60. Phase Lock loop circuit 52 compares the ten megahertz reference oscillator signal to the frequency modulated signal synchronizing the ten megahertz reference oscillator signal with frequency modulated signal from oscillator 60 resulting a 425 MHz phase locked signal occurring at the output of Phase Lock Loop circuit 52.

The RF on/off input to voltage controlled oscillator 60 interrupts supply current to oscillator 60 turning off voltage controlled oscillator 60 when the supply current is interrupted.

Radio Frequency synthesizer 30 also has an RF Detector circuit 64 which includes a Schottky diode and a comparator and which is connected to the eight bit PC bus of test set 10. In addition, the Phase Lock Loop circuit 52 of synthesizer has a Lock Detect output which is connected to the eight bit PC bus of test set 10. The signals provided by RF Detector circuit 64 and the Lock Detect output of circuit 52 are buffered onto the eight bit PC bus of test set 10 as status indicators to the test set software of Appendix A.

A low pass filter 62 has its input connected to the output of voltage controlled oscillator 60 and its output connected to 400 MHz helical rubber coated antenna 32. Low pass filter 62 is a four pole lumped element filter having a cut off frequency of 500 MHz. Low pass filter 62 functions to attenuate any harmonic output from voltage controlled oscillator 60. The RF signal which includes the IRIG tones frequency modulated at 30 kHz deviation onto the 425 MHz carrier is next supplied to antenna 32 for transmission to the missile being tested by test set 10.

Figure 6:
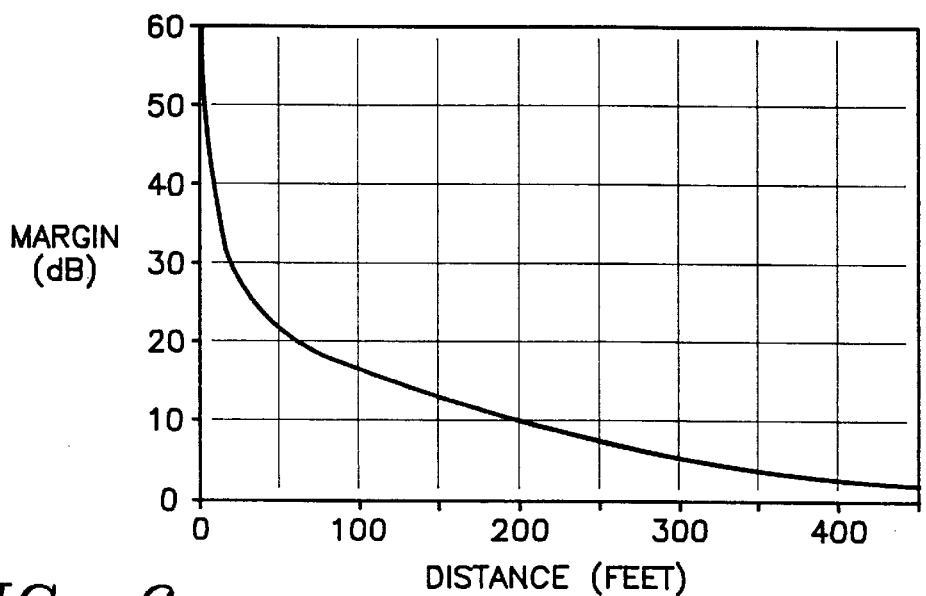
FIG. 6 is a plot illustrating the range of the present invention for flight line testing.

Referring to FIGS. 1 and 6, a link analysis was performed using test set 10. FIG. 6 depicts the margin in dB over receiver threshold plotted as a function of distance in feet. The following parameters were assumed for test set 10, transmitter power of −20 dBm, transmitter antenna gain of −10 dBi, receiver antenna gain of 0 dBi, and an operating frequency of 450 MHz. Test set 10 was required to operate over ranges varying from several inches for bench testing to hundreds of feet for flight line testing. The maximum power allowed into a typical flight termination receiver is −20 dBm to allow the receiver to continue operation. With an output power of −12 dBm into antenna 32, the maximum operating input power to a receiver will generally not be exceeded. The maximum range achievable for flight line testing is then about 500 ft.

Figure 7:
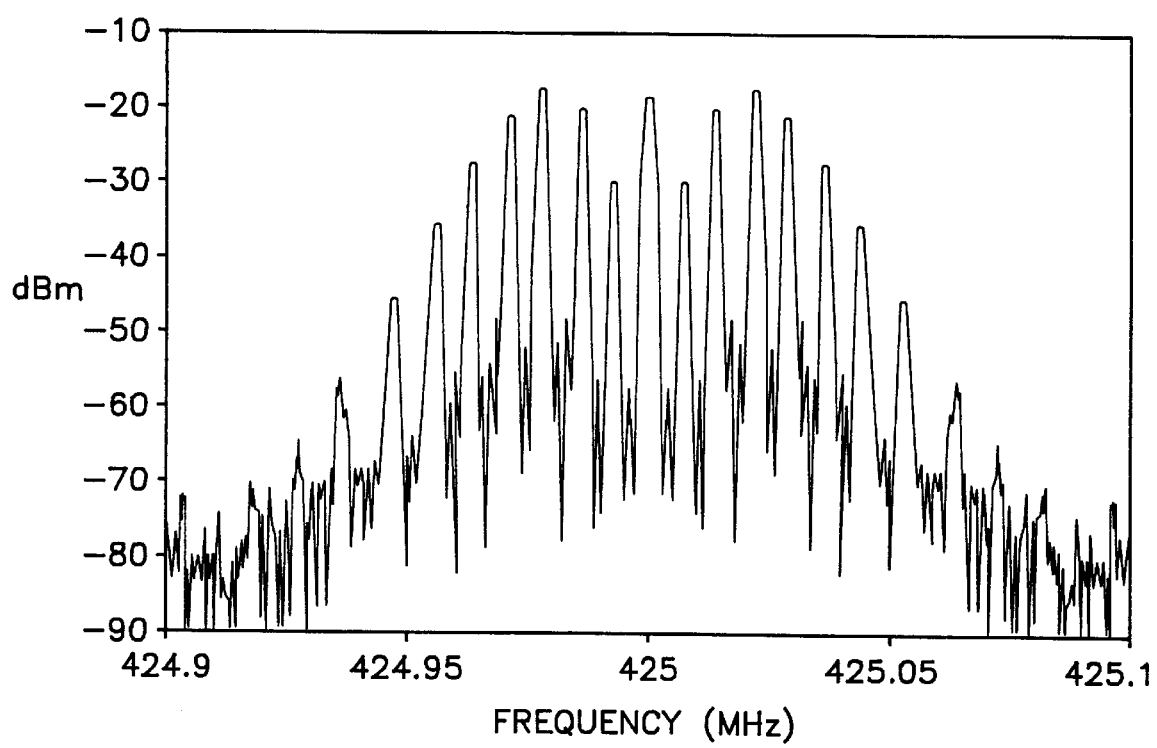
FIG. 7 is an output spectrum plot of an IRIG modulation tone of about 7.5 kHz.

An output spectrum for tone generator and RF synthesizer of FIG. 2 is illustrated in FIG. 7. The modulating signal is IRIG tone 1 which is 7500 kHz.

At this time, it should be noted that the Phase Lock Loop circuit used in the present invention is a 2.0 GHz Low Power PLL Frequency Synthesizer Model Q3236 commercially available from QUALCOMM Incorporated VLSI Products of San Diego, Calif. Further, the voltage controlled oscillator Model POS-535 commercially available from Mini-Circuits of Brooklyn, N.Y.

From the foregoing, it may readily be seen that the present invention comprises a new, unique and exceedingly useful tone generator and transmitter card for use in a flight line test set which constitutes a considerable improvement over the known prior art. Obviously many modifications and variations of the present invention are possible in light of the above teachings. It is therefore to be understood that within the scope of the appended claims that the invention may be practiced otherwise than as specifically described.

APPENDIX A

```
/*******************************************  *
*           FLIGHT LINE TEST SET              *
*     Flight Termination Transmitter board    *
*              13 AUG 1996                    *
*******************************************  /
/* filename: flts.c */
#include "stdio.h"
#include "stdlib.h"
#include "math.h"
#include "dos.h"
#include "bios.h"
```

APPENDIX A -continued

```
#include "ctype.h"
/*  THESE FUNCTIONS STILL NEED SOME WORK AND TESTING
    address   function
    base      write to data bus on DDS1
    base+1    write to data bus on DDS2
    base+2    write to data bus on DDS3
    base+3    write to data bus on DDS4
    base+4    set DDS TC registers in ALTERA
    base+5    set control lines on DDS1 & DDS
    base+6    set control lines on DDS3 & DDS4
    base+7    write to the M1 register on PLL
    base+8    write to the M2 register on PLL
    base+9    write to the A register on PLL
    base+10   set control lines: FSEL, RF on PLL
    base+11   set control lines: HOP on PLL
    base+12   latch ISA data bus onto local data bus
    base+15   read back bit status
*/
#define BASE 0x0300
#define DDS1_DATA BASE
#define DDS2_DATA BASE+1
#define DDS3_DATA BASE+2
#define DDS4_DATA BASE+3
#define TC_REG BASE+4
#define PLL_M1 BASE+7
#define PLL_M2 BASE+8
#define PLL_A BASE+9
#define PLL_CNT BASE+10
#define PLL_HOP_WR BASE+11
#define DBUS BASE+12
#define BIT_REG BASE+15
#define FREQ0_REG 0x08
#define FREQ1_REG 0x09
#define PHASE_REG 0x0a
#define IQMOD_REG 0x0b
#define DDS_CLK 2.5e6
#define TONE_AMP 0
void InitAd7008(void);
void SetToneFreq(int osc,float freq);
void SetToneAmp(int osc,float amp);
void EnableTone(int osc,int OnOff);
void SetXmtrFreq(float freq);
void EnableRF(int OnOff);
int ReadToneGenStatus(void);
void debug(void);
void help(void);
int rf_onoff = 0;
int osc_output[4] = {0,0,0,0};
float xt_freq = 0.0;
/*********************************************   *
*                     MAIN                       *
*********************************************  /
void main(void)
{
    InitAd7008();
    /* display startup messages */
    printf("\r\nFLTS Tone Board Test & Debug Program\r\n");
    printf("*******************************************\r\n");
    debug();
}
/*********************************************   *
*                 DEBUG MODULE                   *
*********************************************  /
void debug(void)
{
float freq,amp;
int osc,temp;
union inkey{
    char ch[2];
    int i;
} c;
    /* debug loop */
    while(!bioskey(1)){   /* wait for key stroke */
        printf("DEBUG> ");  /* display prompt */
        /* decode command and execute */
        c.i = bioskey(0);        /* read the key */
        switch(toupper(c.ch[0])){
            case 'A':            /* set tone freq */
```

APPENDIX A

```
        /* get osc # & center frequency */
        printf(" enter: <osc #> <freq Hz>");
        scanf("%i %f",&osc,&freq);
        printf("\n\rosc = %i, freq = %f",osc,freq);
        SetToneFreq(osc,freq);
        break;
case 'B':        /* toggel IRIG tone */
        /* get osc # */
        printf(" enter: <osc #>");
        scanf("%i",&osc);
        if(osc_output[osc] == 0)
            osc_output[osc] = 1;
        else
            osc_output[osc] = 0;
        printf("\n\rosc = %i, Output = %d",osc,osc_output[osc]);
        EnableTone(osc,osc_output[osc]);
        break;
case 'C':        /* set transmitter frequency */
        /* get transmitter frequency */
        printf(" enter: <freq MHZ>");
        scanf("%f",&freq);
        printf("\n\rfreq = %f",freq);
        xt_freq = freq;
        SetXmtrFreq(freq);
        break;
case 'D':        /* toggel transmitter output */
        if(rf_onoff == 0)
            rf_onoff = 1;
        else
            rf_onoff = 0;
        printf("\n\RF Output = %d",rf_onoff);
        EnableRF(rf_onoff);
        break;
case 'E':        /* read back bit status */
        printf("\n\rBit = %ih",ReadToneGenStatus());
        break;
case 'F':        /* set DDS TC lines */
        printf(" enter: <DDS TC value>");
        scanf("%i",&temp);
        outportb(TC_REG,temp);    /* set TC lines */
        break;
case 'G':        /* set DDS Amplitude */
        /* get osc # & amplitude */
        printf(" enter: <osc #> <Amp %>");
        scanf("%i %f",&osc,&);
        printf("\n\rosc = %i, amp = %f",osc,amp);
        SetToneAmp(osc,amp);
        break;
case 'H':        /* write to PLL M1 */
        printf(" enter: <PLL M1 value>");
        scanf("%i",&temp);
        outportb(DBUS,temp);  /* latch data to data bus */
        outportb(PLL_M1,0);
        break;
case 'I':        /* write to PLL M2 */
        printf(" enter: <PLL M2 value>");
        scanf("%i",&temp);
        outportb(DBUS,temp);  /* latch data to data bus */
        outportb(PLL_M2,0);
        break;
case 'J':        /* write to PLL A */
        printf(" enter: <PLL A value>");
        scanf("%i",&temp);
        outportb(DBUS,temp);  /* latch data to data bus */
        outportb(PLL_A,0);
        break;
case 'K':        /* write data to data bus */
        printf(" enter: <Data Bus value>");
        scanf("%i",&temp);
        outportb(DBUS,temp);
        break;
case 'Q':        /* quit debug */
        printf("\n\rQuit debug");
        return;
case '?':        /* list commands */
        help();
        break;
case '\r':
        break;
default:         /* unknown character */
        printf(" %c ?",c.ch[0]);
    }
    printf("\n\r");
    }
}
/*********************************************  *
 *                    HELP                       *
 *********************************************  /
/* help for debug */
void help(void)
{
    printf("\n\r A: set tone freq");
    printf("\n\r B: toggle IRIG tone");
    printf("\n\r C: set transmitter frequency");
    printf("\n\r D: toggle transmitter output");
    printf("\n\r E: read back bit status");
    printf("\n\r F: set DDS TC lines");
    printf("\n\r G: set DDS Amplitude");
    printf("\n\r H: write to PLL M1");
    printf("\n\r I: write to PLL M2");
    printf("\n\r J: write to PLL A");
    printf("\n\r K: write data to data bus");
}
/*********************************************  *
 *                InitAd7008                     *
 *********************************************  /
/*  initializes AD7008 on power up
    sets commenad register for 8 bit bus, sleep mode,
    amplitude modulation inable, synchonizer logic enabled
    This function will setup the command register
    for an 8 bit bus, sleep mode, amplitude
    modulation enable and synchronizer logic enabled
*/
void InitAd7008(void)
{
    /* set the command register bits to:
       8 bit data bus, normal operation,
       amplitude modulation enabled,
       syncronizer logic enabled
    */
    outportb(DBUS,0x04);  /* latch data to data bus */
    outportb(DDS1_DATA,0);
    outportb(DDS2_DATA,0);
    outportb(DDS3_DATA,0);
    outportb(DDS4_DATA,0);
}
/*********************************************  *
 *                SetToneFreq                    *
 *********************************************  /
/*  This function will turn off the output of the
    selected oscillator and set up its frequency
    set one of 4 tone generator oscillators
    osc - tone oscillator number 0, 1, 2 or 3
    freq - frequency in hertz of the oscillator
*/
void SetToneFreq(int osc,float freq)
{
unsigned char k[4];
unsigned long phase;
char amplitude;
    /* set frequency */
    phase = (unsigned long) (4294967296.0*freq/DDS_CLK);
    printf(" phase word = %li",phase);
    outportb(TC_REG,FREQ0_REG);  /* set pointer to freq register */
    /* 32 bits of data is loaded with 4 writes to the same port */
    k[0] = phase & 0xff;
    phase = phase >> 8;
    k[1] = phase & 0xff;
    phase = phase >> 8;
    k[2] = phase & 0xff;
    phase = phase >> 8;
    k[3] = phase & 0xff;
    /* load MSB first */
    outportb(DBUS,k[3]);      /* latch data to data bus */
    outportb(BASE+osc,0);
    outportb(DBUS,k[2]);      /* latch data to data bus */
```

APPENDIX A

```
        outportb(BASE+osc,0);
        outportb(DBUS,k[1]);      /* latch data to data bus */
        outportb(BASE+osc,0);
        outportb(DBUS,k[0]);      /* latch data to data bus */
        outportb(BASE+osc,0);
        /* set amplitude for deviation of 30 kHz */
        if(xt_freq == 409.0)
           amplitude = 58;
        else if(xt_freq == 421.0)
           amplitude = 61;
        else if(xt_freq == 425.0)
           amplitude = 63;
        else if(xt_freq == 428.0)
           amplitude = 65;
        else if(xt_freq == 439.0)
           amplitude = 72;
        else
           amplitude = 61;
        SetToneAmp(osc,amplitude);
        /* set tone output on or off */
        osc_output[osc] = 1;
        EnableTone(osc,osc_output[osc]);   /* leave on for now */
}
/*********************************** *
*                  SetToneAmp                      *
*********************************** /
/*  This function will set the amplitude of the
    selected oscillator
    osc - tone oscillator number 0, 1, 2 or 3
    amp - ampitude of the oscillator 0 to 100%
*/
void SetToneAmp(int osc,float amp)
{
unsigned char k[4];
unsigned long i_amp;
unsigned long q_amp;
        /* set amplitude */
        outportb(TC_REG,IQMOD_REG);   /* set pointer to IQ mod
                                         register */
        /* 20 bits of data is loaded with 3 writes to the same port */
        amp = amp/2.941176;
        i_amp = (unsigned long) (1024.0*amp/100.0);
        q_amp = (unsigned long) (1024.0*amp/100.0);
        k[0] = i_amp & 0xff;
        i_amp = i_amp >> 8;
        k[1] = (i_amp & 0x03) | (q_amp << 2);
        k[2] = ((q_amp >> 6) & 0x0f);
        /* load MSB first */
        outportb(DBUS,k[2]);      /* latch data to data bus */
        outportb(BASE+osc,0);
        outportb(DBUS,k[1]);      /* latch data to data bus */
        outportb(BASE+osc,0);
        outportb(DBUS,k[0]);      /* latch data to data bus */
        outportb(BASE+osc,0);
}
/*********************************** *
*                  EnableTone                      *
*********************************** /
/*  This function will either turn ON or OFF the
    output of the selected oscillator
*/
void EnableTone(int osc,int OnOff)
{
static int port_mask[2] = {0x11,0x11};
        /* set sleep, reset and fsel lines */
        switch(osc){
           case 0:
              /* set port mask */
              if(OnOff == 1)
                 port_mask[0] = port_mask[0] & 0xfe;  /* clear sleep bit,
                                                        osc on
*/
              else
                 port_mask[0] = port_mask[0] | 0x01;  /* set sleep bit,
                                                        osc off
*/
              outportb(BASE+5,port_mask[0]);
              break;
           case 1:
              /* set port mask */
              if(OnOff == 1)
                 port_mask[0] = port_mask[0] & 0xef;  /* clear sleep bit,
                                                        osc on
*/
              else
                 port_mask[0] = port_mask[0] | 0x10;  /* set sleep bit,
                                                        osc off
*/
              outportb(BASE+5,port_mask[0]);
              break;
           case 2:
              /* set port mask */
              if(OnOff == 1)
                 port_mask[1] = port_mask[1] & 0xfe;  /* clear sleep bit,
                                                        osc on
*/
              else
                 port_mask[1] = port_mask[1] | 0x01;  /* set sleep bit,
                                                        osc off
*/
              outportb(BASE+6,port_mask[1]);
              break;
           case 3:
              /* set port mask */
              if(OnOff == 1)
                 port_mask[1] = port_mask[1] & 0xef;  /* clear sleep bit,
                                                        osc on
*/
              else
                 port_mask[1] = port_mask[1] | 0x10;  /* set sleep bit,
                                                        osc off
*/
              outportb (BASE+6, port_mask[1]);
        }
}
/*********************************** *
*                  SetXmtrFreq                     *
*********************************** /
/*  This function will turn off the RF output and
    set up its center frequency
    freq - carrier frequency, in MHz
*/
void SetXmtrFreq(float freq)
{
unsigned char reg_a;
unsigned char reg_m1;
unsigned char reg_m2;
unsigned char r;
unsigned char a=0;
unsigned int m=0;
unsigned int n;
        */  set reference divider R = 0, ..., 63
            reference input freq = 10MHz
            R = 19 for a reference frequency of 500 kHz
        */
        r = 19;
        n = freq * 2.0;      /* divide freq by 0.5 MHz */
        /* find values for regs a & m */
        for(a = 0;((n-a)%10);)
           a++;
        m = (n - a)/10 - 1;
        printf(" r=%x a=%x n=%d m=%x\n\r",r,a,n,m);
        /* pack data into words for loading into PLL */
        reg_a = a | (r<<4);
        reg_m1 = m & 0x7f;   /* also set pre_en = 0, active low */
        reg_m2 = (m >> 7) | ((r >> 2) & 0x0c);
        outportb(DBUS,reg_a);      /* latch data to data bus */
        outportb(PLL_A,0);
        outportb(DBUS,reg_m1);     /* latch data to data bus */
        outportb(PLL_M1,0);
        outportb(DBUS,reg_m2);     /* latch data to data bus */
        outportb(PLL_M2,0);
        /* output register values */
        printf("reg_a = %x, reg_m1 = %x,
        reg_m2 = %x\n\r",reg_a,reg_m1,reg_m2);
        /*   set control lines
```

-continued

APPENDIX A

```
    FSELP = 1 primary frequency
    HOP_WR latches primary data into secondary regs,
       rising edge active
    */
    outportb(PLL_HOP_WR,0x00); /* dummy write to
    load secondary registers */
    rf_onoff = 0;   /* set on for now */
    EnableRF(rf_onoff);
}
/*******************************************  *
*                   EnableRF                   *
********************************************  /
/*  This function will either turn ON or OFF
    the RF output
*/
void EnableRF(int OnOff)
{
    if(OnOff)
        outportb(PLL_CNT,0x03); /* RF on & FSEL not selected */
    else
        outportb(PLL_CNT,0x01); /* RF off & FSEL not selected */
}
/*******************************************  *
*              ReadToneGenStatus               *
********************************************  /
/*  This function will return RF present and PLL status
    returns RF present, PLL lock status
*/
int ReadToneGenStatus(void)
{
    /* reads back status */
    return(inportb(BIT_REG));
}
/* end */
```

What is claimed is:

1. A tone generator and transmitter card for use in a flight line test set adapted for testing a weapons system, said tone generator and transmitter card comprising:

generating means being adapted to receive a plurality of digital phase words from an eight bit data bus within said flight line test set, said generating means responsive to said plurality of digital phase words generating a plurality of Interrange Instrumentation Group decoder tones;

a radio frequency synthesizer connected to said generating means to receive said plurality of Interrange Instrumentation Group decoder tones, said radio frequency synthesizer frequency modulating each of said Interrange Instrumentation Group decoder tones onto a carrier signal within a predetermined bandwidth;

antenna means connected to said radio frequency synthesizer to receive said carrier signal, said antenna means transmitting said carrier signal to said weapons system;

said radio frequency synthesizer including:
a reference oscillator having an output;
a phase lock loop circuit having a clock input connected to the output of said reference oscillator, said phase lock loop circuit having an RF input and a phase output;
a loop filter having an input connected to the phase output of said phase lock loop circuit and an output;
a summer having a first input connected to the output of said loop filter, a second input connected to said generating means and an output;
a voltage controlled oscillator having an input connected to the output of said summer and an output connected to the RF input of said phase lock loop circuit;
a low pass filter having an input connected to the output of said voltage controlled oscillator and an output; and said antenna means being connected to the output of said low pass filter.

2. The tone generator and transmitter card of claim 1 wherein said generating means comprises first, second, third and fourth tone generators, each of said first, second, third and fourth tone generators being adapted to connect to said eight bit data bus.

3. The tone generator and transmitter card of claim 2 wherein each of said first, second, third and fourth tone generators comprises:

a frequency register adapted for connection to said eight bit data bus, said frequency register having an output;

a phase accumulator having an input connected to the output of said frequency register and an output;

a Sine/Cosine ROM having an input connected to the output of said phase accumulator, a first output and a second output;

a first multiplier having a first input connected to the first output of said Sine/Cosine ROM, a second input and an output;

a second multiplier having a first input connected to the second output of said Sine/Cosine ROM, a second input and an output;

an I modulation register having an output connected to the second input of said first multiplier;

a Q modulation register having an output connected to the second input of said second multiplier;

a summer having a first input connected to the output of said first multiplier, a second input connected to the output of said second multiplier and an output; and a digital to analog converter having an input connected to the output of said summer and an output connected to said radio frequency synthesizer.

4. The tone generator and transmitter card of claim 2 wherein each of said first, second, third and fourth tone generators includes an active two pole filter with a cut off frequency of about 250 kHz.

5. The tone generator and transmitter card of claim 1 wherein each of said plurality of Interrange Instrumentation Group decoder tones is within a frequency range from about 7500 hertz to about 74,000 hertz.

6. The tone generator and transmitter card of claim 1 wherein the predetermined bandwidth of said carrier signal is from about 400 megahertz to about 440 megahertz.

7. The tone generator and transmitter card of claim 1 wherein said antenna means comprises a 400 MHz helical rubber coated antenna.

8. A tone generator and transmitter card for use in a flight line test set, said tone generator and transmitter card comprising:

first, second, third and fourth tone generators, each of said first, second, third and fourth tone generators being adapted to connect to an eight bit PC data bus within said flight line test set, each of said first, second, third and fourth tone generators having an output;

a radio frequency synthesizer connected to the output of said first, second, third and fourth tone generators;

a helical antenna connected to said radio frequency synthesizer;

said radio frequency synthesizer including:
a reference oscillator connected to each of said first, second, third and fourth tone generators;
a phase lock loop circuit having a clock input connected to said reference oscillator, said phase lock loop circuit having an RF input and a phase output;

a loop filter having an input connected to the phase output of said phase lock loop circuit and an output;

a summer having a first input connected to the output of said loop filter, a second input connected to the output of each of said first, second, third and fourth tone generators and an output;

a voltage controlled oscillator having an input connected to the output of said summer and an output connected to the RF input of said phase lock loop circuit;

a low pass filter having an input connected to the output of said voltage controlled oscillator and an output; and said helical antenna being connected to the output of said low pass filter.

9. The tone generator and transmission card of claim 8 further comprising an radio frequency detect circuit having an input connected to the output of said low pass filter and an output being adapted to connect to said eight bit PC data bus.

10. The tone generator and transmission card of claim 8 wherein each of said first, second, third and fourth tone generators comprises:

a frequency register adapted for connection to said eight bit PC data bus, said frequency register having an output;

a phase accumulator having an input connected to the output of said frequency register and an output;

a Sine/Cosine ROM having an input connected to the output of said phase accumulator, a first output and a second output;

a first multiplier having a first input connected to the first output of said Sine/Cosine ROM, a second input and an output;

a second multiplier having a first input connected to the second output of said Sine/Cosine ROM, a second input and an output;

an I modulation register having an output connected to the second input of said first multiplier;

a Q modulation register having an output connected to the second input of said second multiplier;

a summer having a first input connected to the output of said first multiplier, a second input connected to the output of said second multiplier and an output; and a digital to analog converter having an input connected to the output of said summer and an output connected to said radio frequency synthesizer.

11. The tone generator and transmission card of claim 8 wherein each of said first, second, third and fourth tone generators includes an active two pole filter with a cut off frequency of about 250 kHz.

* * * * *